United States Patent
McMackin et al.

(10) Patent No.: US 6,860,025 B1
(45) Date of Patent: Mar. 1, 2005

(54) MEASUREMENT OF CONTAINER WALL THICKNESS

(75) Inventors: Shaun P McMackin, Maumee, OH (US); James H. Jaquillard, Pemberville, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 10/331,208

(22) Filed: Dec. 30, 2002

(51) Int. Cl.⁷ .................................................. G01B 5/06
(52) U.S. Cl. ........................... 33/522; 33/549; 33/555; 33/783
(58) Field of Search ......................... 33/522, 542, 543, 33/548, 549, 555, 783, 784, 792, 832, 833

(56) References Cited

U.S. PATENT DOCUMENTS

| | | | | |
|---|---|---|---|---|
| 2,607,127 A | * | 8/1952 | Wagenhals | 33/542 |
| 2,616,068 A | * | 10/1952 | McDonald | 33/549 |
| 3,353,277 A | * | 11/1967 | Johnson | 33/792 |
| 3,913,234 A | * | 10/1975 | Windle | 33/549 |
| 4,006,529 A | * | 2/1977 | Herman | 33/548 |
| 4,170,830 A | * | 10/1979 | Weber | 33/542 |
| 5,048,341 A | | 9/1991 | Lundell | |
| 5,208,997 A | * | 5/1993 | Tas | 33/783 |
| 5,917,328 A | | 6/1999 | Dimmick | |
| 6,041,512 A | | 3/2000 | Wacke | |
| 6,327,788 B1 | | 12/2001 | Seddon | |
| 6,370,787 B1 | | 4/2002 | Kikuchi | |
| 6,412,186 B1 | | 7/2002 | Keys | |
| 6,415,526 B1 | * | 7/2002 | Buckner et al. | 33/833 |

* cited by examiner

*Primary Examiner*—Diego Gutierrez
*Assistant Examiner*—Madeline Gonzalez

(57) ABSTRACT

Apparatus for measuring wall thickness of a container having an open mouth includes a gauge indicator mounted on a support base, and having a first tip and a readout that provides an indication of position of the first tip. A probe arm includes a rod mounted on the base, a second tip pivotally mounted on the rod, a sleeve slidable on the rod, and a link connecting the sleeve to the second tip such that pivotal position of the second tip on the rod is controlled by position of the sleeve along the rod. The second tip is movable between a first position at which a container mouth is receivable over the second tip, and a second position at which the second tip internally engages the wall of the container in opposition to the first tip such that the readout provides a measure of container wall thickness between the first and second tips.

8 Claims, 4 Drawing Sheets

MEASUREMENT OF CONTAINER WALL THICKNESS

The present invention is directed to measuring wall thickness of containers, particularly flask-shaped containers.

BACKGROUND AND SUMMARY OF THE INVENTION

It has heretofore been proposed to measure the sidewall thickness of a container by placing the container on a mandrel arm with a pivotal head. The mandrel arm is inserted through the open mouth of the container. The head has a tip that internally engages the wall of the container, and is mechanically coupled to a second arm that carries an electronic gauge. The gauge has a tip that externally engages the container wall opposite the point of internal engagement between the head and the inside surface of the container wall. The mechanical coupling between the arms is such that the arms may move up and down in unison to accommodate non-circularity in the container wall as it is manually rotated on the mandrel without affecting the output of the electronic gauge.

Although the container wall thickness measurement technique so described has been employed successfully in the art, further improvements remain desirable. In particular, although the described measurement technique is well suited for measuring sidewall thickness of cylindrical containers, the described technique is not well suited for measuring sidewall thickness of non-cylindrical containers, such as flask-shaped containers that have closely spaced front and back walls and widely spaced sidewalls. It is a general object of the present invention to provide an apparatus for measuring wall thickness of such non-round containers, particularly flask-shaped containers.

The present invention embodies a number of aspects, which may be implemented separately from or more preferably in combination with each other.

Apparatus for measuring wall thickness of a container having an open mouth, in accordance with a first aspect of the present invention, includes a gauge indicator mounted on a support base. The gauge indicator has a first tip for externally engaging the wall of a container and a readout that provides an indication of position of the first tip. A probe arm includes a rod mounted on the base, a second tip pivotally mounted on the rod, a sleeve slidable on the rod, and a link connecting the sleeve to the second tip such that pivotal position of the second tip on the rod is controlled by position of the sleeve along the rod. The second tip is movable between a first position at which a container mouth is receivable over the second tip, and a second position at which the second tip internally engages the wall of the container in opposition to the first tip such that the readout provides a measure of container wall thickness between the first and second tips.

Apparatus in accordance with a second aspect of the present invention for measuring wall thickness of a flask-shaped container includes first and second gauge assemblies. The first gauge assembly includes a first exterior tip for engaging an exterior point on the front or back wall of a flask-shaped container, a first probe arm for insertion through the open mouth of the container and having a first interior tip on the first probe for engaging an interior point on the container front or back wall opposed to the exterior point such that separation between the first tips varies as a function of a first wall thickness between the exterior and interior points, and a first indicator coupled to the first exterior tip for indicating the first wall thickness. The second gauge assembly includes a second exterior tip for engaging a second exterior point on a sidewall of the container, a second probe arm for insertion through the open mouth of the container and having a second interior tip pivotally mounted on the second probe, a control for adjusting angular position of the second interior tip with respect to the axis of the second probe, following insertion of the probe through the container mouth, to engage a second interior point on a container sidewall such that separation between the second tips varies as a function of a second wall thickness between the second exterior and interior points, and a second indicator coupled to the exterior second tip for indicating the second wall thickness.

BRIEF DESCRIPTION OF THE DRAWINGS

The invention, together with additional objects, features, advantages and aspects thereof, will be best understood from the following description, the appended claims and the accompanying drawings in which:

DETAILED DESCRIPTION OF PREFERRED EMBODIMENTS

Figure 1:
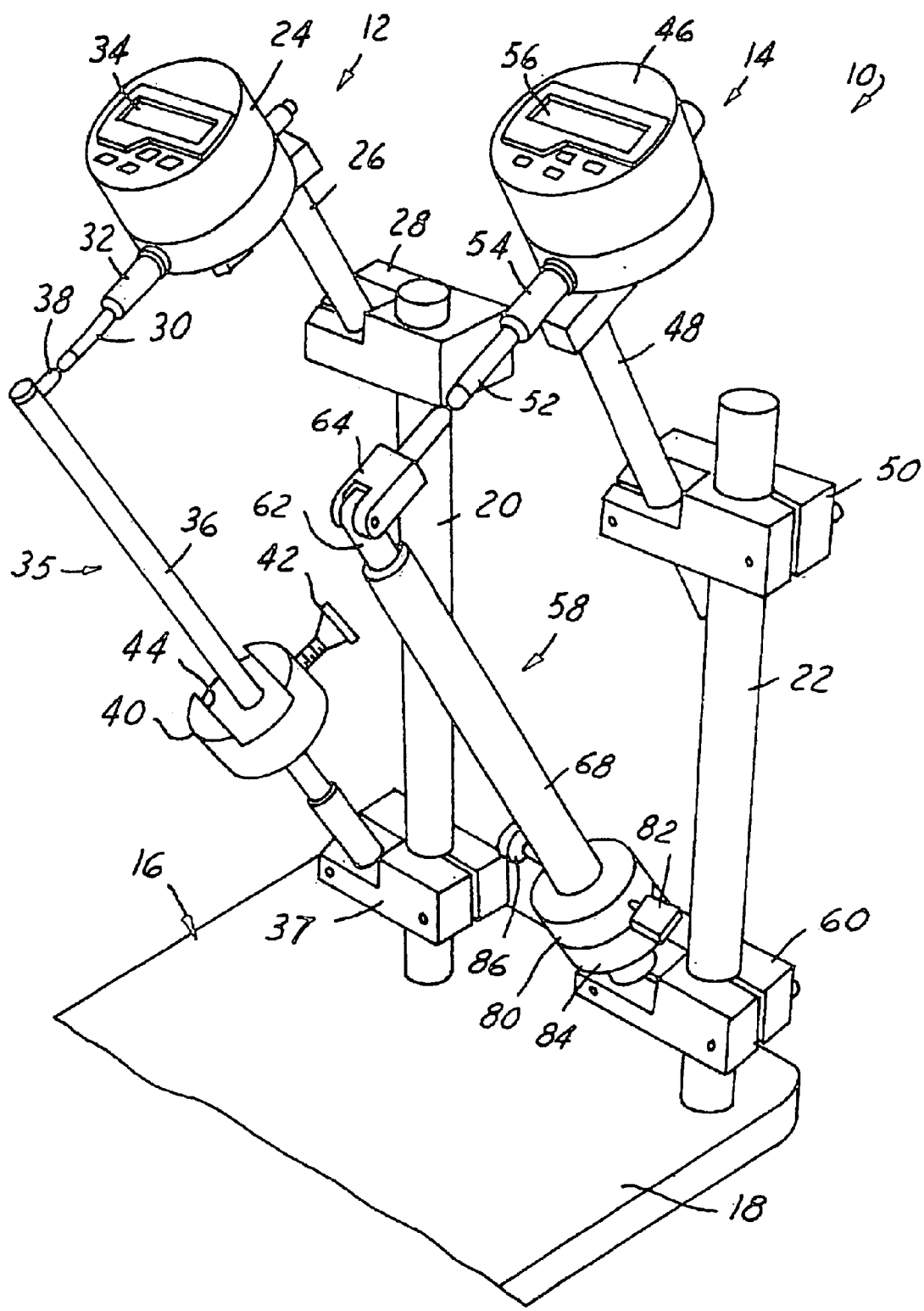
FIG. 1 is a front perspective view of an apparatus for measuring wall thickness of a container in accordance with a presently preferred embodiment of the invention.

The drawings illustrate an apparatus 10 for measuring container wall thickness in accordance with an exemplary presently preferred embodiment of the invention as comprising a first gauge assembly 12 and a second gauge assembly 14 mounted on a support base 16. Support base 16 preferably includes a single support plate 18, although separate support plates may be provided for separately mounting first and second gauge assemblies 12, 14. Support plate 18 has a pair of upstanding gauge support bars 20, 22, which preferably are parallel to each other. First gauge assembly 12 is mounted on support bar 20, and includes an indicator 24 cantilevered by a rod 26 from a bracket 28 adjustably mounted on bar 20. Indicator 24 has a gauge pin or tip 30 that is axially slidable in a sleeve 32, and a readout 34 for indicating the position of tip 30 within sleeve 32. Readout 34 preferably is electronic, although non-electronic dial-type indicator readouts may also be employed. A first probe arm assembly 35 includes a rod 36 cantilevered from a bracket 37 adjustably mounted on bar 20. Brackets 28, 37 preferably are positioned so that rods 26, 36 are substantially parallel to but spaced from each other. A tip 38 is secured to the upper end of rod 36 in opposition to indicator tip 30. Tip 38 preferably is non-movably secured to the end of rod 36 at an angle of 90° to the axis of rod 36. A support collar 40 is slidable along rod 36, and may selectively be clamped to the rod by means of a screw 42. Collar 40 has a laterally extending channel 44 formed in the upper surface of the collar.

Figure 3:
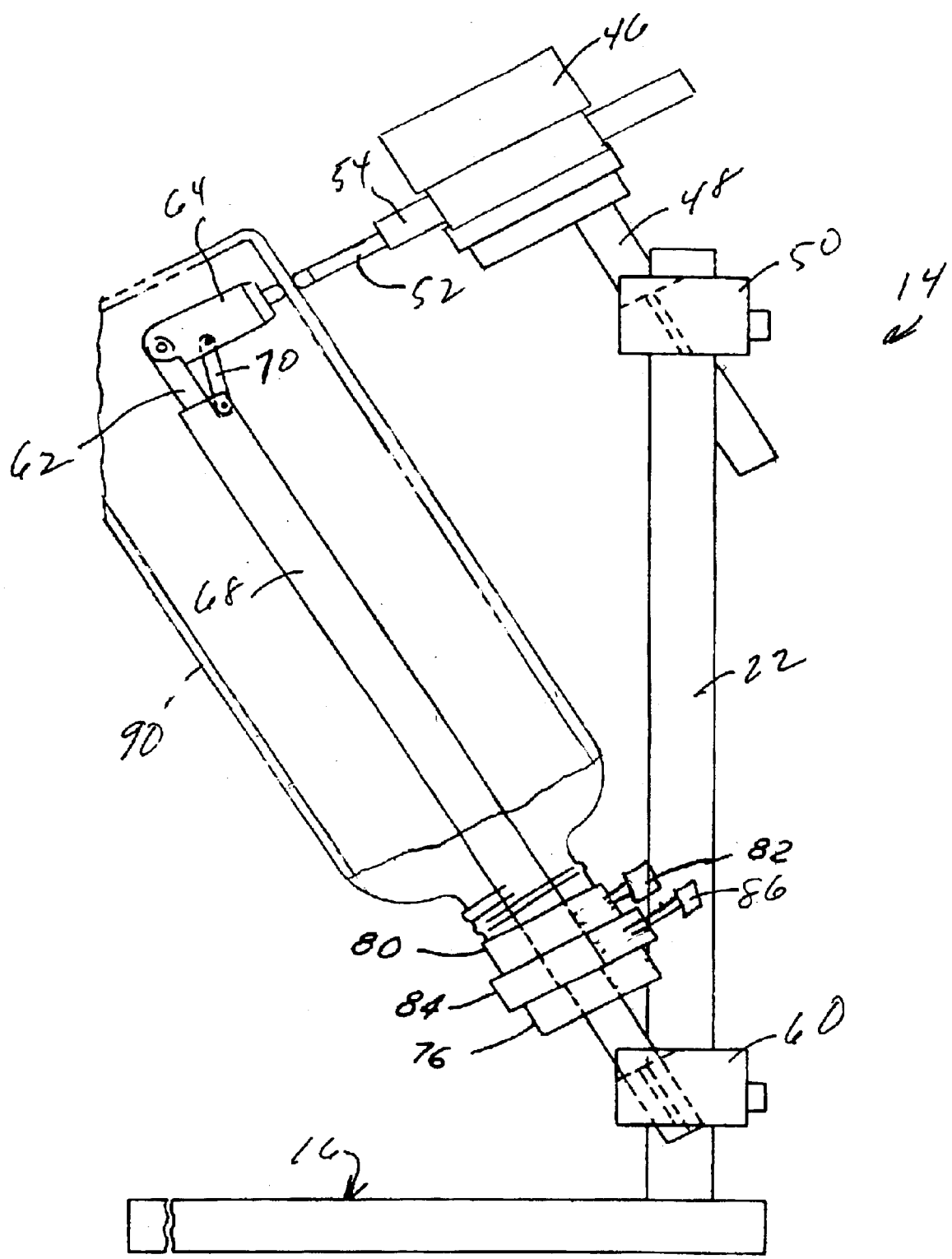
FIG. 3 is an opposing side elevational view of the apparatus illustrated in FIG. 1.
Figure 4:
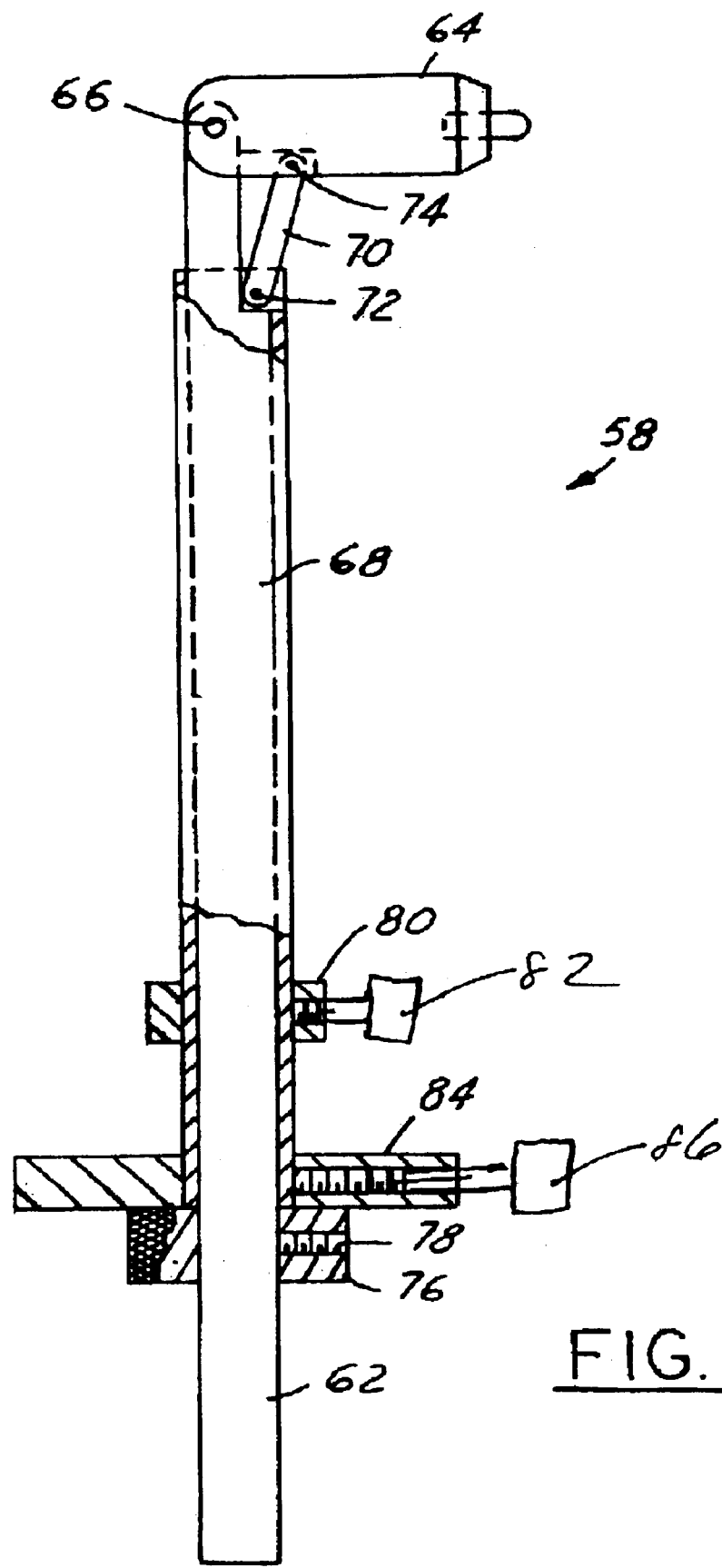
FIG. 4 is a partially sectioned elevational view of the probe arm assembly illustrated in FIG. 3.

Second gauge assembly 14 includes a second indicator 46 cantilevered by a rod 48 from a bracket 50 that is adjustably positionable on bar 22. Indicator 46 includes a tip 52 that is axially slidable in a sleeve 54 to provide a corresponding tip position indication at a readout 56. A second probe arm assembly 58 is cantilevered from a second bracket 60 adjustably positionable on bar 22. Brackets 50, 60 preferably are adjustably positioned on bar 22 such that probe arm assembly 58 is substantially parallel to but spaced from rod 48. Probe arm assembly 58 includes an elongate rod 62 secured at one end to bracket 60 and having a tip 64 secured to the opposing end by a pivot pin 66. A hollow sleeve 68 is externally axially slidable along rod 62. A link 70 has one end pivotally secured to the adjacent end of sleeve 68 by a pin 72. The opposing end of link 70 is secured to tip 64 by a pivot pin 74. Thus, link 70 secures tip 64 to sleeve 68 in such a way that the pivotal position of tip 64 around pin 66—i.e., with respect to the axis of rod 62—is controlled by the axial position of sleeve 68 along rod 62. A collar 76 is selectively adjustably positionable lengthwise of rod 62, and is coupled thereto by means of a set screw 78. Collar 76 acts as an abutment stop for engagement with the end of sleeve 68 opposite from tip 64 to set the angular orientation of tip 64 with respect to rod 62 in the measurement position of the tip—e.g., the 90° orientation in the drawings. The tip could be placed at a different, angle, such as 45°, for measurement of heel thickness for example. A second collar 80 is adjustably positionable along sleeve 68, and is selectively secured thereto by means of a set screw 82. Collar 80 acts as a rest for the finish of a container under measurement, as illustrated in FIG. 3. A third collar 84 is mounted on sleeve 68, preferably at the end of the sleeve remote from tip 64, and is secured thereto by means of a set screw 86. Collar 86 functions as a handle to facilitate manual axial movement of sleeve 68 along rod 62.

Figure 2:
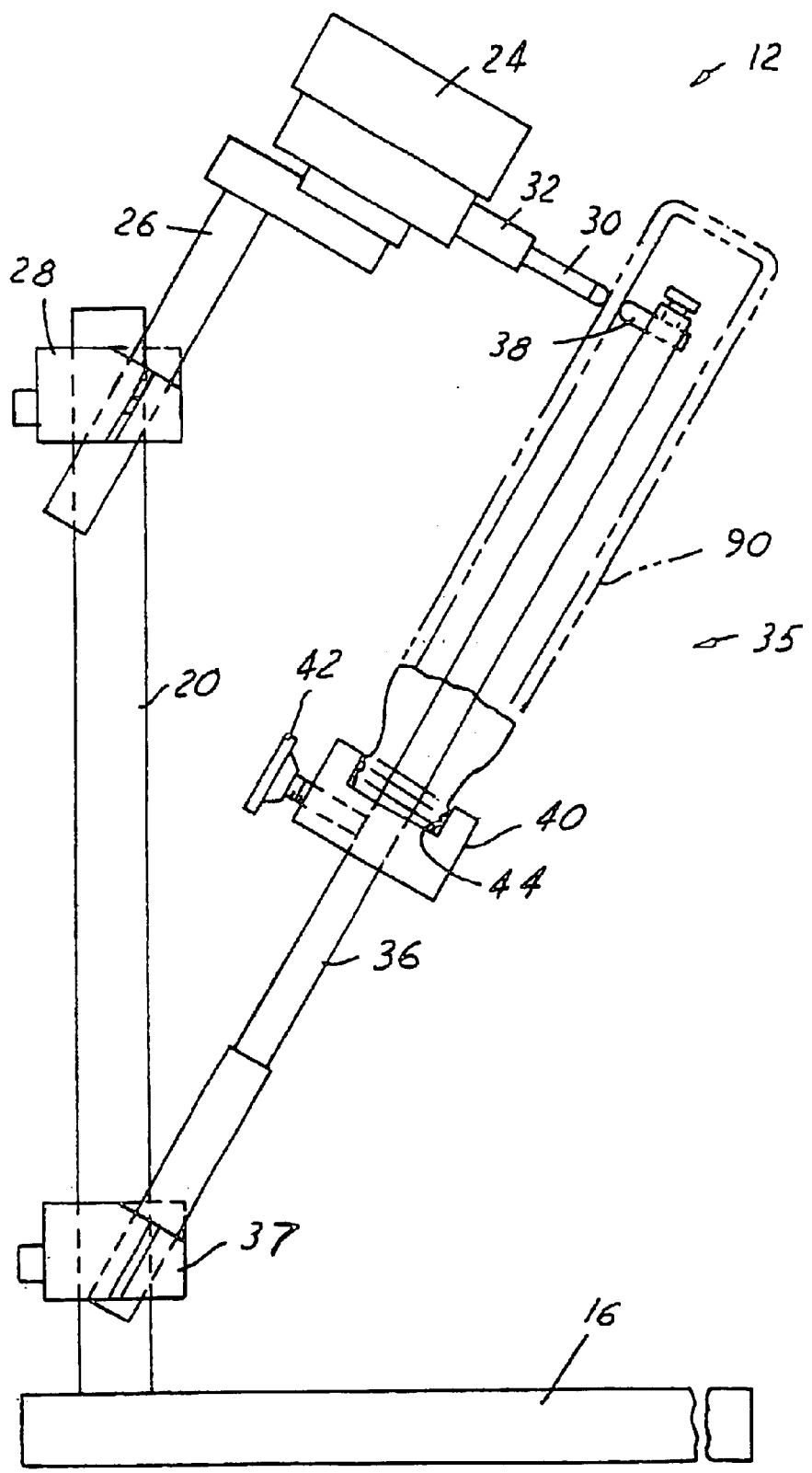
FIG. 2 is a side elevational view of the apparatus illustrated in FIG. 1.

In use of apparatus 10, tip 30 of indicator 24 is positioned against tip 38 as illustrated in FIG. 1, and gauge readout 34 is set to zero. In the same way, tip 64 is positioned at the 90° orientation with respect to rod 62 as illustrated in FIG. 1, and readout 56 is set to zero with tip 52 in opposed engagement with tip 64. To measure the thicknesses of the front or back wall of a flask-shaped container 90, gauge tip 38 is manually withdrawn from opposed engagement with tip 38, and the open mouth of the container is received over tip 38 and rod 36. The container finish can be positioned in abutment with collar 40 as illustrated in FIG. 2, and gauge tip 30 is then released. With tip 38 in internal engagement with a container front or back wall, and with tip 30 in opposed engagement with the external surface of the front or back wall, the spacing between the tips, indicated at readout 34, provides a measure of wall thickness. Container 90 may be moved side-to-side by sliding the finish along slot 44 in collar 40 to measure any lateral variation in front or back wall thickness. Collar 40 also may be adjustably positioned along rod 36 to measure container wall thicknesses at differing axial positions along the container wall. It has been found that the container may be manually positioned axially along rod 36, without moving collar 40, and still provide accurate wall thickness readings because of the limited lateral dimension between the container front and back walls as compared with the axial dimension of the container.

To measure the wall thickness of either container sidewall (FIG. 3), sleeve 68 is first positioned along rod 62 such that tip 64 extends axially from the end of the rod. In this position of the tip, the container mouth and finish may be received over tip 64, externally along sleeve 68 and rested on collar 80. Collar 80 thus forms an abutment stop for supporting the container; finish during measurement, and is adjustably positionable along sleeve 68 by means of set screw 82. With the container finish resting on collar 80, sleeve 68 may then be moved along rod 62, using collar 84 as a handle, until the end of the sleeve abuts collar 76. At this point, tip 64 is opposed to tip 52 of indicator 46, and preferably at a 90° angle to the axis of rod 62. The length of tip 64 is such that the tip engages the inside surface of the sidewall of a flask-shaped container under test, while indicator tip 52 engages an opposing point on the exterior surface of the container sidewall. Separation between the tips thus provides a measure of sidewall thickness, which is indicated at readout 56. To remove the container, sleeve 68 is repositioned along rod 62 so that tip 64 extends in a direction parallel to the axis of the rod, and the container may be removed from probe arm assembly 58.

There has thus been described an apparatus for measuring the wall thickness of containers, including particularly flask-shaped containers. The invention has been described in conjunction with an exemplary presently preferred embodiment thereof, and a number of modifications and variations have been described. Other modifications and variations will readily suggest themselves to persons of ordinary skill in the art. For example, as noted above, support base 16 may comprise separate plates 18 for the respective gauge assemblies 10, 12. Indicators 24, 46 may be electronic or mechanical. It is currently preferred for reasons of economy to provide rods 36, 62 and sleeve 68 of cylindrical configuration. However, inasmuch as sleeve 68 does not rotate with respect to rod 62, the rods and sleeve may be of non-cylindrical contour if desired. Tip 64 may be removable and provided in differing dimensions for measuring sidewall thicknesses of differing container capacities. It is also noted, in accordance with the broadest aspects of the invention, that gauge assembly 14 can be employed for measuring wall thicknesses of round containers. The invention is intended to embrace all modifications and variations as fall within the spirit and broad scope of the appended claims.

What is claimed is:

1. Apparatus for measuring wall thickness of a container having an open mouth, which includes:
   a gauge indicator mounted on a support base, and including a first tip and a readout that provides an indication of position of said first tip, and
   a probe arm including a rod mounted on said base, a second tip pivotally mounted on said rod, a sleeve slidable on said rod, and a link connecting said sleeve to said second tip such that pivotal position of said second tip on said rod is controlled by position of said sleeve on said rod,
   said second tip being pivotal between a first position at which a container mouth is receivable over said second tip, and a second position at which said second tip internally engages the wall of the container in opposition to said first tip, such that said readout provides a measure of container wall thickness between said first and second tips,
   said probe arm including a first abutment stop on said rod for engaging an end of said sleeve and thereby setting said second position of said second probe tip with respect to said rod, and a second abutment stop on said sleeve for limiting movement of the container over said second tip and said sleeve.

2. The apparatus set forth in claim 1 wherein said first abutment stop is secured to said rod at a position such that said second tip is at an angle of 90° to said rod in said second position of said second tip.

3. The apparatus set forth in claim 1 wherein said second abutment stop is adjustably positionable along said sleeve.

4. Apparatus for measuring wall thickness of a flask-shaped container having an open mouth, closely spaced front and back walls and widely spaced sidewalls, said apparatus including:

a first gauge assembly having a first exterior tip for engaging an exterior point on a front or back wall of a container, a first probe arm for insertion through the open mouth of the container and having a first interior tip mounted on said first probe arm for engaging an interior point on the container front or back wall opposed to said exterior point, such that separation between said first tips varies as a function of a first wall thickness between said exterior and interior points, a collar for supporting the container mouth with respect to said first tips, and a first indicator coupled to said first exterior tip for indicating said first wall thickness, and a second gauge assembly including a second exterior tip for engaging a second exterior point on a sidewall of a container, a second probe arm for insertion through the open mouth of the container and having a second interior tip pivotally mounted on said second probe arm, a control for adjusting angular orientation of said interior second tip with respect to the axis of said second probe arm, following insertion of said second probe through the container mouth, to engage a second interior point on a container sidewall such that separation between said second tips varies as a function of a second wall thickness between said second exterior and interior points, and a second indicator coupled to said exterior second tip for indicating said second wall thickness, wherein said second probe arm includes a rod, said second interior tip being pivotally mounted on said rod, a sleeve slidable on said rod and a link connecting said sleeve to said second interior tip such that pivotal position of said second interior tip on said rod is controlled by position of said sleeve along said rod.

5. The apparatus set forth in claim 4 wherein said first gauge assembly includes first brackets mounting said first gauge assembly, including said first exterior tip, said first probe arm and said first indicator, on a support base, and wherein said second gauge assembly includes second brackets spaced from said first brackets mounting said second gauge assembly, including said second exterior tip, said second probe arm and said second indicator, on the same said support base.

6. The apparatus set forth in claim 4 wherein said second probe arm includes a first abutment stop on said rod for engaging an end of said sleeve and thereby setting said pivotal position of said second interior tip with respect to said rod.

7. The apparatus set forth in claim 6 wherein said first abutment stop is secured to said rod at a position such that said second interior tip is at an angle of 90° to said rod in said pivotal position of said second tip.

8. The apparatus set forth in claim 4 wherein said first interior tip is secured in fixed position to said first probe arm at an angle of 90° to said first probe arm.

* * * * *